(12) United States Patent
Sankar et al.

(10) Patent No.: US 7,230,914 B2
(45) Date of Patent: Jun. 12, 2007

(54) METHOD AND SYSTEM FOR SYNCHRONIZING A STANDBY ROUTE DISTRIBUTOR IN A DISTRIBUTED ROUTING PLATFORM

(75) Inventors: Ramkumar Sankar, Santa Clara, CA (US); Sreeram P. Iyer, Sunnyvale, CA (US); Sachchidanand D. Vaidya, San Jose, CA (US); Vijay K. Chander, Livermore, CA (US); Atul B. Mahamuni, San Jose, CA (US); Henry Hong-Yi Tzeng, San Jose, CA (US)

(73) Assignee: Nokia Inc., Irving, TX (US)

( * ) Notice: Subject to any disclaimer, the term of this patent is extended or adjusted under 35 U.S.C. 154(b) by 957 days.

(21) Appl. No.: 10/424,222

(22) Filed: Apr. 25, 2003

(65) Prior Publication Data

US 2004/0100969 A1 May 27, 2004

Related U.S. Application Data

(63) Continuation-in-part of application No. 10/302,709, filed on Nov. 22, 2002, now Pat. No. 6,850,492.

(51) Int. Cl.
*G01R 31/08* (2006.01)
*H04J 3/06* (2006.01)
*G06F 17/30* (2006.01)
*G06F 11/00* (2006.01)

(52) U.S. Cl. .................. 370/218; 370/503; 707/8; 714/6

(58) Field of Classification Search ........ 370/217–220, 370/242, 244, 503; 714/6, 13; 707/8
See application file for complete search history.

(56) References Cited

U.S. PATENT DOCUMENTS

| 5,873,909 | A  | * | 2/1999 | Brodmann et al. ............ 8/403 |
| 6,947,963 | B1 | * | 9/2005 | Agarwal et al. ............ 709/201 |
| 7,006,431 | B1 | * | 2/2006 | Kanekar et al. ............ 370/217 |
| 2003/0056138 | A1 | * | 3/2003 | Ren ............................ 714/4 |
| 2004/0090913 | A1 | * | 5/2004 | Scudder et al. ............. 370/219 |

* cited by examiner

*Primary Examiner*—Chau Nguyen
*Assistant Examiner*—Nittaya Juntima
(74) *Attorney, Agent, or Firm*—Squire, Sanders & Dempsey L.L.P.

(57) ABSTRACT

A system and method is directed to synchronizing a standby route distributor in a distributed routing platform. A route distributor is configured to operate as an active route distributor. Another route distributor is configured to operate as a standby route distributor. The standby and active route distributor may reside in the same or a different distributed routing platform. A slave route distributor communicates a route to the active route distributor. The active route distributor may update its routing tables with the route. The active route distributor forwards the route to the standby route distributor to enable their routing tables to be substantially synchronized. The standby route distributor distributes the route to the slave route distributors, where the route enables an update to another routing table. In the event of a switchover, the standby route distributor resynchronizes its routing tables and may distribute route information to each slave route distributor.

26 Claims, 10 Drawing Sheets

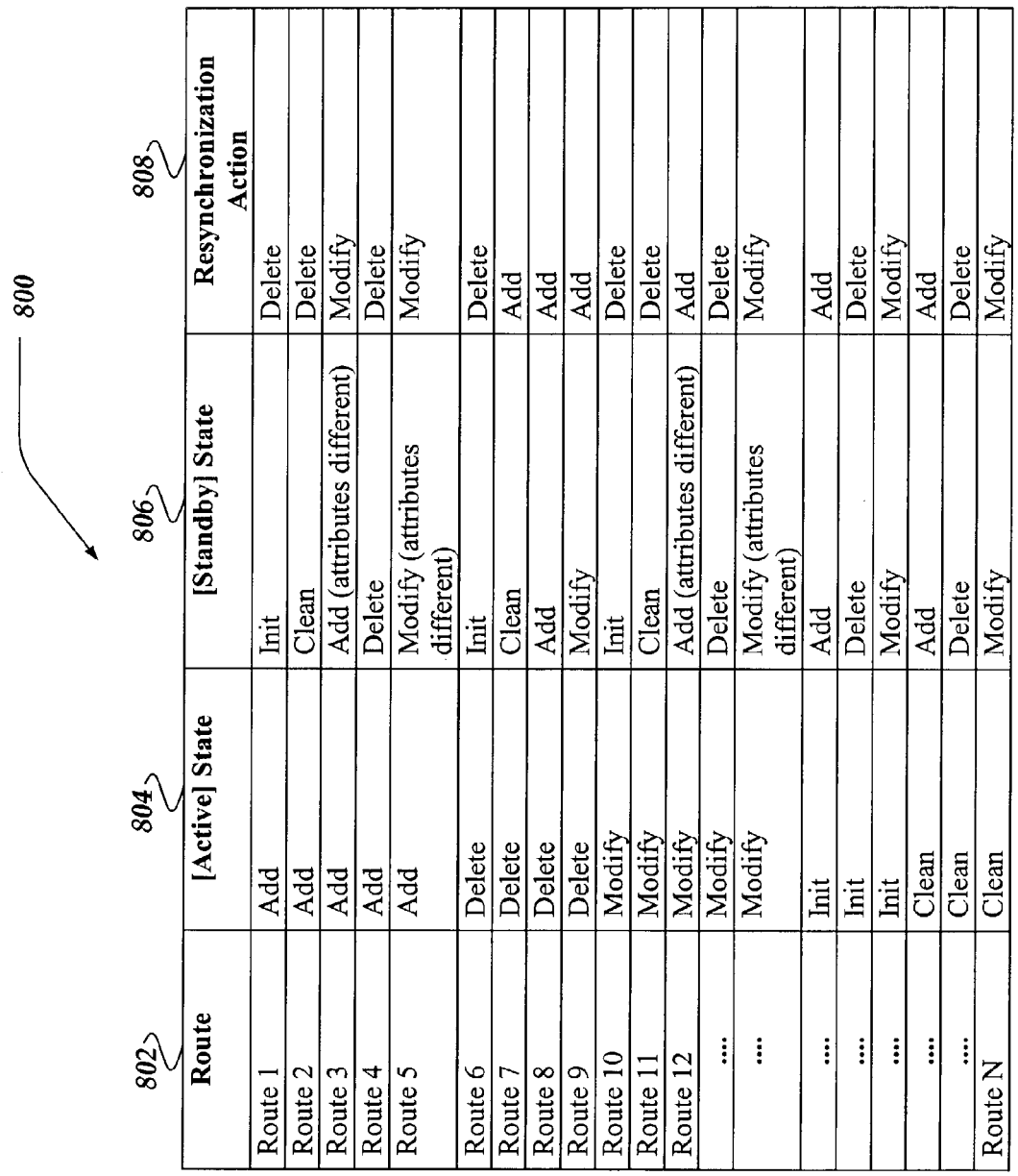

| Route | [Active] State | [Standby] State | Resynchronization Action |
|---|---|---|---|
| Route 1 | Add | Init | Delete |
| Route 2 | Add | Clean | Delete |
| Route 3 | Add | Add (attributes different) | Modify |
| Route 4 | Add | Delete | Delete |
| Route 5 | Add | Modify (attributes different) | Modify |
| Route 6 | Delete | Init | Delete |
| Route 7 | Delete | Clean | Add |
| Route 8 | Delete | Add | Add |
| Route 9 | Delete | Modify | Add |
| Route 10 | Modify | Init | Delete |
| Route 11 | Modify | Clean | Delete |
| Route 12 | Modify | Add (attributes different) | Add |
| ... | Modify | Delete | Delete |
| ... | Modify | Modify (attributes different) | Modify |
| ... | Init | Add | Add |
| ... | Init | Delete | Delete |
| ... | Init | Modify | Modify |
| ... | Clean | Add | Add |
| ... | Clean | Delete | Delete |
| Route N | Clean | Modify | Modify |

*Fig. 8.*

METHOD AND SYSTEM FOR SYNCHRONIZING A STANDBY ROUTE DISTRIBUTOR IN A DISTRIBUTED ROUTING PLATFORM

CROSS REFERENCE TO RELATED APPLICATIONS

This utility patent application is a continuation-in-part of U.S. patent application Ser. No. 10/302,709, filed Nov. 22, 2002, now U.S. Pat. No. 6,850,492 of which the benefit of the earlier filing date is hereby claimed under 35 U.S.C. §120, and which is hereby incorporated by reference.

FIELD OF THE APPLICATIONS

The present invention relates to networks, and more particularly to synchronizing of routing protocols between an active and standby route distributor.

BACKGROUND OF THE INVENTION

With the tremendous growth of the Internet, enormous demands have been placed on network infrastructures. To address these demands, modern routers employ various routing architectures, including shared bus, parallel Central Processing Units (CPUs), interface CPUs, and crossbar switch architectures. Many of these architectures further employ a distributed approach, where the performance of routing functions is distributed among the router's main processing components and multiple intelligent line cards installed within the router. Each intelligent line card is typically configured to provide a routing protocol or routing protocols.

Generally, a distributed routing architecture is more scalable, and capable of providing more services than a router with a centralized architecture. Traditionally, this problem is solved by distributing the routing-tables to the intelligent line cards. However, as the number of routing-protocol packets directed to a particular routing protocol increase, a traditional distributed routing architecture becomes congested. Moreover, traditional solutions may not adequately address failures in a router in the distributed routing architecture. Therefore, it is with respect to these considerations and others that the present invention is made.

SUMMARY OF THE INVENTION

The present invention is directed to addressing the above-mentioned shortcomings, disadvantages and problems, and will be understood by reading and studying the following specification.

The present invention provides a system and method directed to synchronizing a standby route distributor in a distributed routing platform. A route distributor is configured to operate as an active route distributor. Another route distributor is configured to operate as the standby route distributor. The active route distributor forwards route information to the standby route distributor to enable their routing tables to be substantially synchronized. The standby route distributor distributes the route information to a slave route distributor, where the route information enables an update to another routing table. In the event of a switchover, the standby route distributor resynchronizes its routing tables and may distribute route information to each slave route distributor.

In one aspect of the present invention, a method is directed to synchronizing a routing table. In the method, a route is received and used to update an active routing table associated with an active route distributor. The route is also forwarded to a standby route distributor. A standby routing table associated with the standby route distributor is updated with the route, such that at least a portion of the standby routing table and the active routing table are substantially synchronized. The standby distributor distributes the route to a slave route distributor, so that the slave route distributor is enabled to update a slave routing table associated with the slave route distributor.

In another aspect of the present invention, another method is directed to synchronizing a routing table. A standby route distributor is employed to receive a route. The received route is added to a routing table associated with the standby route distributor. If the route is from an active route distributor, the standby route distributor is employed to distribute the route to at least one slave route distributor such that the slave route distributor is enabled to update a slave routing table. Additionally, an active state associated with the route is updated, and a response is provided to the active route distributor. The response indicates that at least a portion of the routing table associated with the standby route distributor is substantially synchronized with another routing table that is associated with the active route distributor.

Moreover, in one embodiment of the method, if the route is from a routing protocol associated with the standby route distributor, a standby state associated with the route is updated. The route is marked based on a comparison of the active state and standby state associated with the route.

In still another aspect of the present invention, a router is directed to updating a routing table. The router includes a slave route distributor, an active route distributor, and a standby route distributor. The slave route distributor is on a first node, and is configured to receive a route associated with a routing protocol associated with the slave route distributor. The active route distributor is on a second node and is configured to perform actions, including receiving the route from the slave route distributor, and updating a active routing table associated with the active route distributor. The standby route distributor is on a third node, and is configured to perform actions, including receiving the route from the active route distributor, updating a standby routing table associated with the standby route distributor, and distributing the route to another slave route distributor. Updating the standby routing table is directed to substantially synchronizing at least a portion of the standby routing table with the active routing table. Moreover, the other slave route distributor is configured to update another routing table associated with the other slave route distributor.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein:

FIG. 8 illustrates one embodiment of a table of states and actions performed during a resynchronization between routing modules;

DETAILED DESCRIPTION OF THE PREFERRED EMBODIMENTS

Figure 1:
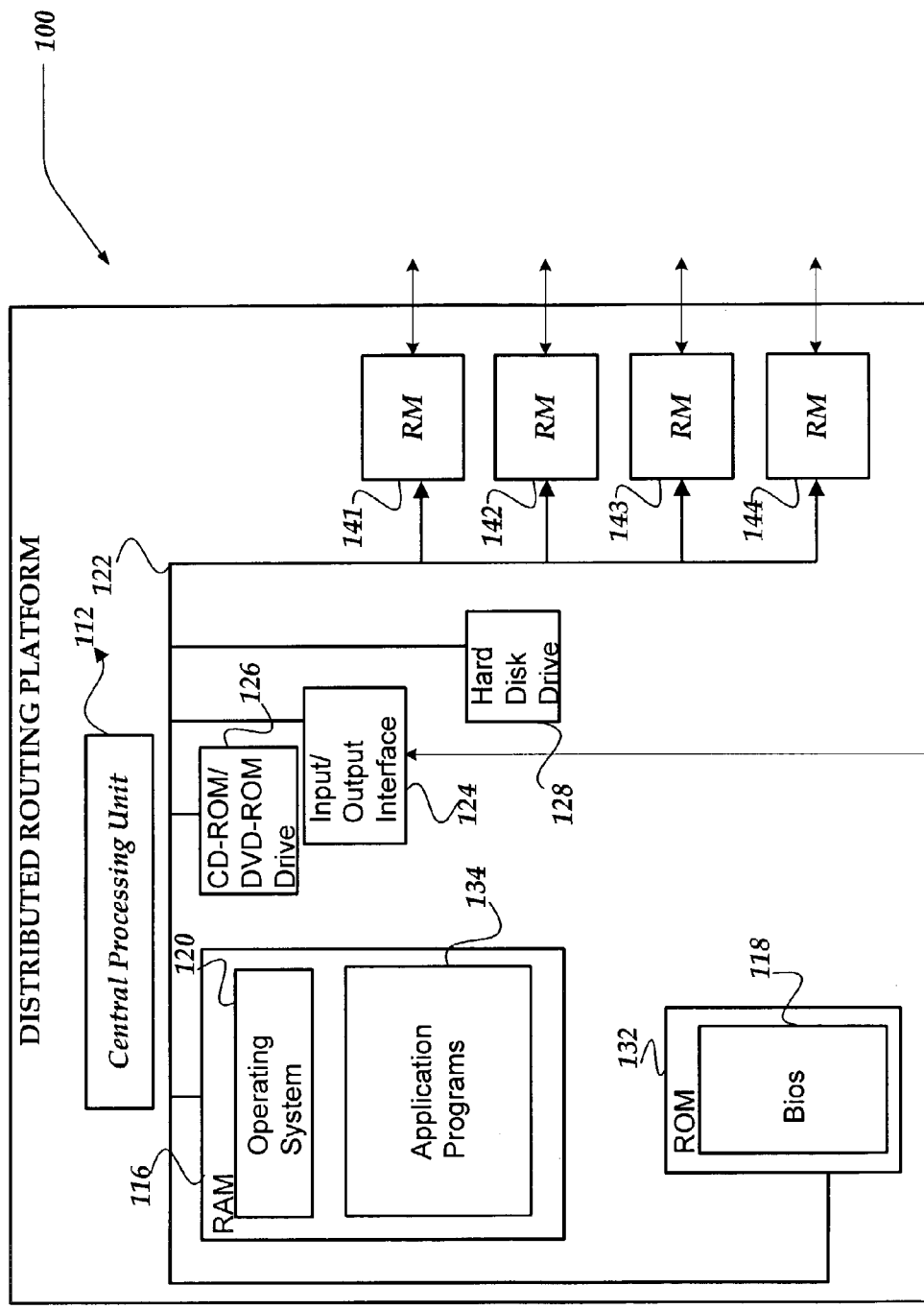
FIG. 1 illustrates a block diagram generally showing an overview of one embodiment of a distributed routing platform.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise.

A "distributed routing platform" comprises a computing device that is capable of performing services and network routing functions, where the performance of the services and functions are distributed among the platform's system control points and service-creation/routing points.

A "packet" comprises an arbitrary or selectable amount of data that may be represented by a sequence of one or more bits. A packet, for example, may correspond to a data unit found in a layer of the Open Systems Interconnect (OSI) model, such as a segment, message, datagram, frame, symbol stream, stream, and a combination of data units found in the OSI model or a non-OSI data unit.

The term "signal" includes, but is not limited to, at least one control current signal, voltage signal, or packet control signal. The term "flow" includes a flow of packets. The term "traffic" includes a flow of at least one packet.

The term "node" includes, but is not limited to, an intelligent component in the distributed routing platform that may actively participate in the maintenance of a distributed route table.

The term "GDP" or "Generic Distribution Protocol" includes to a generic scheme of distributing information from one node to others. The implementation of the exact distribution protocol or inter-processor communication is outside the scope of this invention.

The term "FTM" means a Forwarding Table Manager. This term includes, but is not limited to, a function in a distributed routing platform that manages the forwarding table, which is consulted for forwarding the IP packets received by the platform.

The terms "route" or "classification rule" includes, but is not limited to, a route, a flow, an attribute list, a rule, a route operation, and a set of rules for processing the packet based on the contents of the packets. This includes, for example, rules based on the IP destination address, and other fields (Layer-2 to Layer-7 information) in the packet.

The term "route attribute", or sometimes "attribute," includes, but is not limited to, a metric associated with the route, next-hop information, an output interface identifier associated with the route, and the like.

The term "best route" comprises a set of routes selected for distribution, a route selected from a set of routes used for distribution, or the like. The selection may be based, for example, on one or more criteria including, but not limited to, local policies, shortest path, preferred path, and the like. These may or may not be the same as the most optimal routes for the system.

The meaning of "a," "an," and "the" include plural references. The meaning of "in" includes "in" and "on."

Additionally, a reference to the singular includes a reference to the plural unless otherwise stated or is inconsistent with the disclosure herein.

Briefly stated, the present invention is directed to a system and method for synchronizing a standby routing table to an active routing table in a distributed routing platform. A route distributor is configured to operate as an active route distributor. Another route distributor is configured to operate as a standby route distributor. A slave route distributor communicates a route to the active route distributor. The active route distributor may update its active routing table with the route. The active route distributor forwards the route to the standby route distributor. The standby route distributor employs the route to update its standby routing table such that it is substantially synchronized with the active routing table. Additionally, the standby route distributor distributes the route to another slave route distributor, where the distributed route enables an update to another routing table. Moreover, the standby route distributor maintains state information about the route that may be employed where the active route distributor becomes unavailable. In the event the active route distributor is unavailable, the standby route distributor resynchronizes its routing table and may distribute route information to each slave route distributor.

Illustrative Environment

FIG. 1 illustrates a block diagram generally showing an overview of one embodiment of a distributed routing platform. Distributed routing platform 100 may operate as a server, workstation, network appliance, router, bridge, firewall, gateway, a traffic management device, and the like. Distributed routing platform 100 may include many more components than those shown in FIG. 1. However, the components shown are sufficient to disclose an illustrative environment for practicing the present invention.

Distributed routing platform 100 may include processing unit 112 and a mass memory, all connected via bus 122. Bus 122 may provide inter process communications, employing a variety of protocols, including Generic Distribution Protocol (GDP). The mass memory generally includes random access memory ("RAM") 116, read-only memory ("ROM") 132, and one or more permanent mass storage devices, such as hard disk drive 128, a tape drive (not shown), optical drive 126, such as a CD-ROM/DVD-ROM drive, and/or a floppy disk drive (not shown). The mass memory stores application programs 134 and operating system 120 for controlling the operation of distributed routing platform 100. Operating system 120 may comprise a general-purpose, or special-purpose operating system including, for example, UNIX, LINUX™, or one produced by any of a variety of other operating system vendors. Basic input/output system ("BIOS") 118 is also provided for controlling the low-level operation of distributed routing platform 100.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules, and other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Distributed routing platform 100 may also comprise input/output interface 124 for communicating with external devices, such as a mouse, keyboard, scanner, or other input devices not shown in FIG. 1. In some embodiments of the invention, distributed routing platform 100 does not include user input/output components. For example, distributed routing platform 100 may or may not be connected to a monitor. In addition, distributed routing platform 100 may or may not have input/output interface 124. For example, distributed routing platform 100 may implement a network appliance, such as a router, gateway, traffic management device, and the like, which is connected to a network and that does not need to be directly connected to user input/output devices. Such a device may be accessible, for example, over a network.

Distributed routing platform 100 also includes Routing Modules (RMs) 141–144. RMs 141–144 are described in more detail in conjunction with FIGS. 2–3. Briefly, however, RMs 141–144 contain the routing tables that direct the routing of Internet Protocol (IP) packets received by the platform. RMs 141–144 may be configured to perform one or more services on the data packets before routing them. RMs 141–144 may also be configured to perform the services or to forward the packets to another routing modules that performs the services. RMs 141–144 are further configured to provide routes, and routing protocol information, to each other, thereby enabling multiple routing protocols to be executed on different routing modules. RMs 141–144 may be a transport service module (TSM) providing a service-creation/transport point, a control processor (CP) card that maintains system-wide information, a routing engine (RE), and the like. Moreover, each RM may represent a separate node. In addition, each node may in turn be included in one or more line cards, and the like, within distributed routing platform 100. As discussed herein, distributed routing platform 100 operates as a scalable router, where each RM resides on a separate node associated with the scalable router.

In addition, RMs 141–144 include the necessary circuitry for connecting to networks, such as the Internet, local area networks, and the like. RMs 141–144 are configured to employ various communication protocols including the TCP/IP protocol, inter-node inter-process communications protocol including GDP, and may include or interface with circuitry and components for transmitting messages and data over a wired and/or wireless communications medium.

Although four RMs are illustrated in FIG. 1, the invention is not limited to four, and more or less RMs may be employed without departing from the scope or spirit of the present invention.

Figure 2:
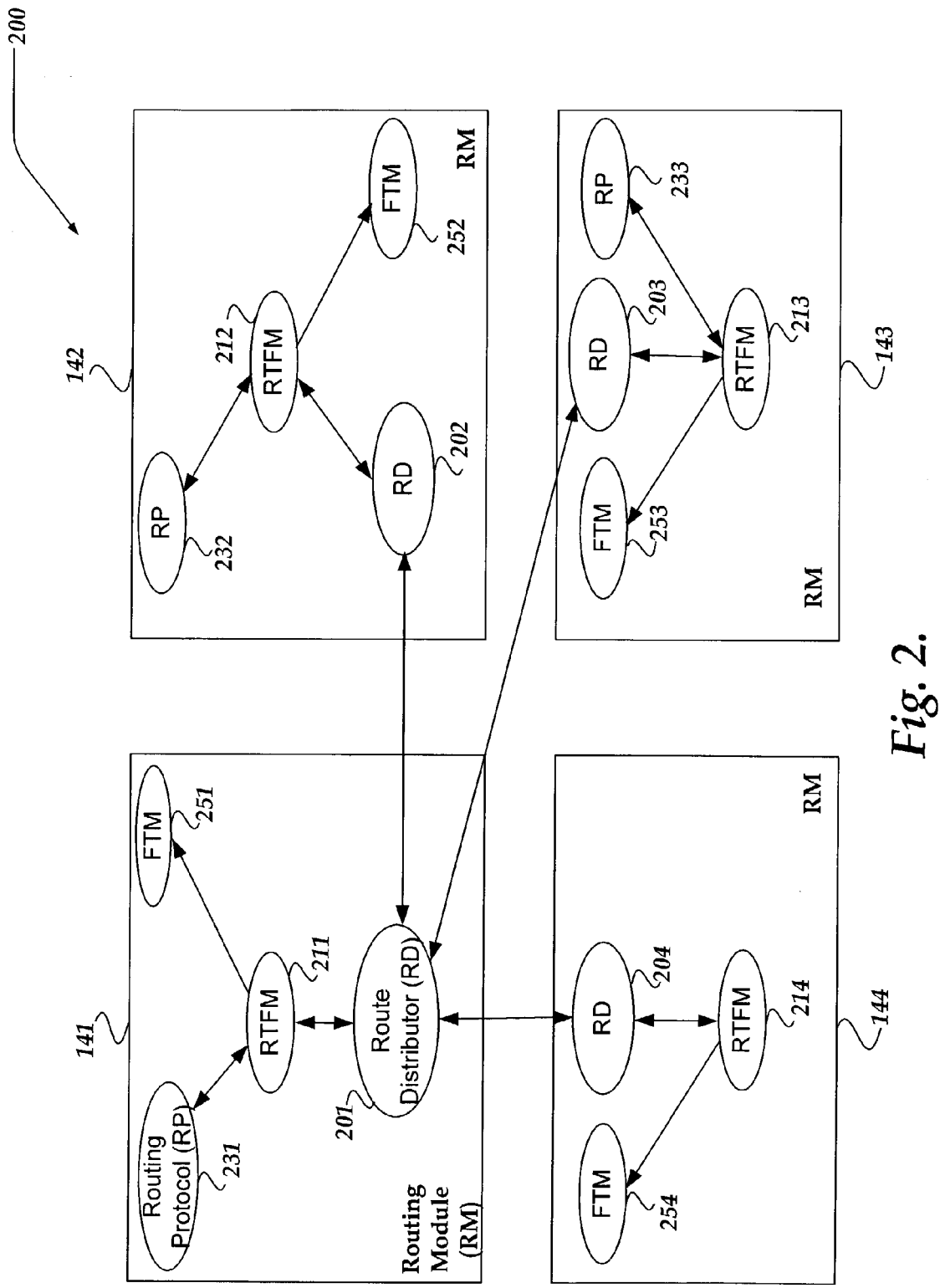
FIG. 2 illustrates a functional block diagram of one embodiment of four routing modules as shown in FIG. 1.

FIG. 2 illustrates a functional block diagram of one embodiment of four routing modules, such as shown in FIG. 1. As shown, routing system 200 includes RMs 141–144. RM 141 includes Routing Protocol (RP) 231, Forwarding Table Module (FTM) 251, Route Table and Flow Manager (RTFM) 211, and Active Route Distributor (RD) 201. RM 142 includes RP 232, FTM 252, RTFM 212, and Route Distributor (RD) 202. RM 143 includes RP 233, FTM 253, RTFM 213, and RD 203. Moreover, RM 144 includes FTM 254, RTFM 214, and RD 204.

Distribution of the RTFMs and RDs across multiple RMs as shown in FIG. 2 is directed to minimizing congestion of route updates to Routing-Protocols through the scalable router.

RTFM 211 is in communication with RP 231, FTM 251, and RD 201. RD 201 is also in communication with RD 202–204. RTFM 212 is in communication with RP 232, FTM 252, and RD 202. RTFM 213 is in communication with RP 233, FTM 253, and RD 203. Additionally, RTFM 214 is in communication with FTM 254, and RD 204.

RPs 231–233 are configured to determine a route that enables an IP packet to be forwarded beyond a local segment across an internetwork to a destination. RMs 141–144 may employ a variety of routing protocols to determine a route, including, but not limited to directly connected interface protocols, static routing protocols, default routing protocols, and dynamic routing protocols such as Routing Information Protocols (RIPs), Open Shortest Path First (OSPF), Enhanced Interior Gateway Routing Protocol (EIGRP), Border Gateway Protocol (BGP), Intermediate System-to-Intermediate System (ISIS), and the like.

FTMs 251–254 are configured to map a route, route information, IP-flow information, and the like to the Forwarding Table consulted for forwarding the IP packets.

RTFMs 211–214 are configured to receive a route, route information, and the like, and to determine a best route based in part on the route. In one embodiment, at least one RTFM is pre-defined as a active RTFM, and the other RTFMs within the distributing routing platform are non-active RTFMs. RTFMs 211–214 are also configured to manage routing rules that enable routing of an IP packet. Such routing rules may specify services that are performed on certain classes of packets by RTFMs 241–244 and the ports to which the packets are forwarded. RTFMs 211–214 may employ a switch tag (not shown) to enable the distribution of packets, routing rules, routes, and the like to an RP, and RD. In one embodiment, RTFMs 211–214 employ a notification change list to communicate route and route information to the associated RD.

The active RTFM further includes a database (not shown) that is configured to store a global best route and associated route information, and an active-forwarding rule for distributed routing platform 100. Moreover, active RTFM may also manage identifiers associated with each routing protocol in distributed routing platform 100.

Figure 3:
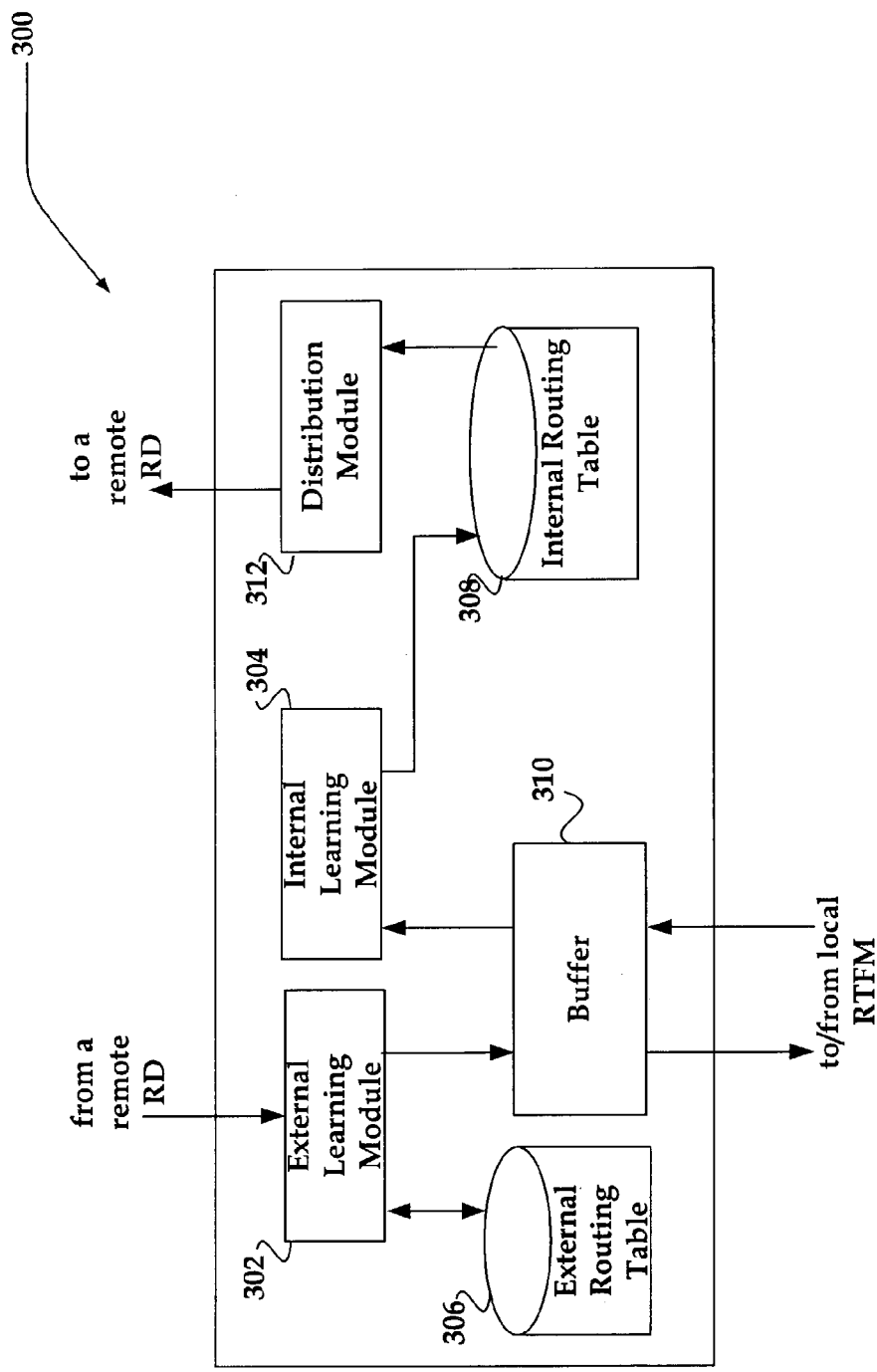
FIG. 3 is a functional block diagram of an embodiment of a Route Distributor employing components for enabling an update of a routing table in a distributed routing platform, such as shown in FIG. 1.

RDs 201–204 are described in more detail in conjunction with FIG. 3. Briefly, however, RDs 201–204 are configured to enable an exchange of route and route information between RMs 141–144 in distributed routing platform 100. RDs 201–204 facilitate a uniform perspective of the routing rules, routes, and route information independent of which RM originated the information, thereby further facilitating a scalable distributed routing architecture. Moreover, as shown in FIG. 2, RDs 201–204 are arranged to isolate RTFMs 211–214 from knowing on which node an RP resides. As such, route, and routing information associated with an RP may be made readily accessible to each RTFM across the router.

Generally, at least one RD may be designated as an active RD. The other RDs in distributed routing platform 100 are designated as slave RDs. The slave RDs are configured to communicate through the active RD. The active RD is enabled to manage global decisions across distributed routing platform 100. For example, active RD may determine which route, routing rule, IP-flow and the like is a global best among conflicting information received from slave RDs.

The active RD is further configured to manage a "joining" and "leaving" of a slave RD to distributed routing platform 100. In one embodiment, information associated with the joining slave RD is maintained in a J-set. Information associated with the leaving slave RD is maintained in an L-set. The J-set and L-set may be a list, a database, a repository, and the like. The J-set may be employed to provide bulk update information to joined slave RDs. The L-set may be employed to enable joined slave RDs to unlearn information about left RDs.

The active RD may further maintain a receiver set, called an R-set. The R-set is configured to provide information associated with a peer RD with which the active RD communicates. The R-set may be configured based on a routing protocol type, such as BGP, RIP, and the like.

FIG. 3 is a functional block diagram of an embodiment of a Route Distributor (RD) employing components for enabling an update of a routing table in a distributed routing platform, such as shown in FIG. 1. As shown in the figure, RD 300 includes External Learning Module (ELM) 302, Internal Learning Module (ILM) 304, external routing table 306, internal routing table 308, buffer 310, and distribution module 312.

ELM 302 is in communication with external routing table 306 and buffer 310. ILM 304 is in communication with buffer 310 and internal routing table 308. Internal routing table 308 is also in communication with distribution module 312.

Buffer 310 may include volatile, removable and non-removable media, and Random Access memory (RAM), implemented in any method or technology for storage of information, such as computer readable instructions, data structures, routes, routing information, and the like. In one embodiment, buffer 310 is a First I/First Out (FIFO) memory store.

External routing table 306 includes a table structure, list, database, and the like that is configured to store routes, routing rules, routing information, and the like that is received from another RD. Internal routing table 308 a table structure, list, database, and the like that is configured to store routes, routing rules, routing information, and the like that is received from a local RTFM.

ELM 302 is configured to receive information from another RD. ELM 302 is also configured to manage the received information in external routing table 306. Moreover, ELM 302 is configured to determine a best route between two or more routes associated with virtually identical routing rules. In one embodiment, ELM 302 stores the received routes in external routing table 306 in a best route order. ELM 302 is further configured to provide route, route information, and routing rules to the local RTFM through buffer 310.

In one embodiment, ELM 302 receives route and route information from another RD by way of an inter process communications protocol, including Generic Distribution Protocol (GDP), Pipes, Dynamic Data Exchange (DDE), Sequenced Packet Exchange (SPX), Inter Applications Communications (IAC), and the like. The route and route information may be formatted in a routing packet that includes a packet header and body. The header may indicate the source RD and target RD. The body may include an entry that describes a changed route and its associated route information.

ILM 304 is configured to receive route and routing information from the local RTFM through buffer 310. In one embodiment, ILM 304 receives route and routing information from the local RTFM.

ILM 304 is further configured to determine actions associated with the received route. For example, the local RTFM may request that a notify-status operation, redistribute operation, and the like to be performed, where the operation may be an add, delete, and modify of the route and its associated route information.

ILM 304 also manages the contents of internal routing table 308 based in part on information received from the local RTFM. Moreover, ILM 304 may populate internal routing table 308 with route and route information obtained from external routing table 306. This may arise, for example, where a notify-status operation directs an addition of the best route to external routing table 308.

Distribution module 312 is configured to select a route in internal routing table 308 and distribute the route and associated route information. If the current RD is an active RD, then the distribution of the route is to slave RDs. If the current RD is a slave RD, then the distribution of the route is to the active RD(s). In one embodiment, distribution module 312 communicates the route and route information to another RD by way of an inter process communications protocol, such as GDP, DDE, SPX, IAC, and the like.

Generalized Operation

Figure 4:
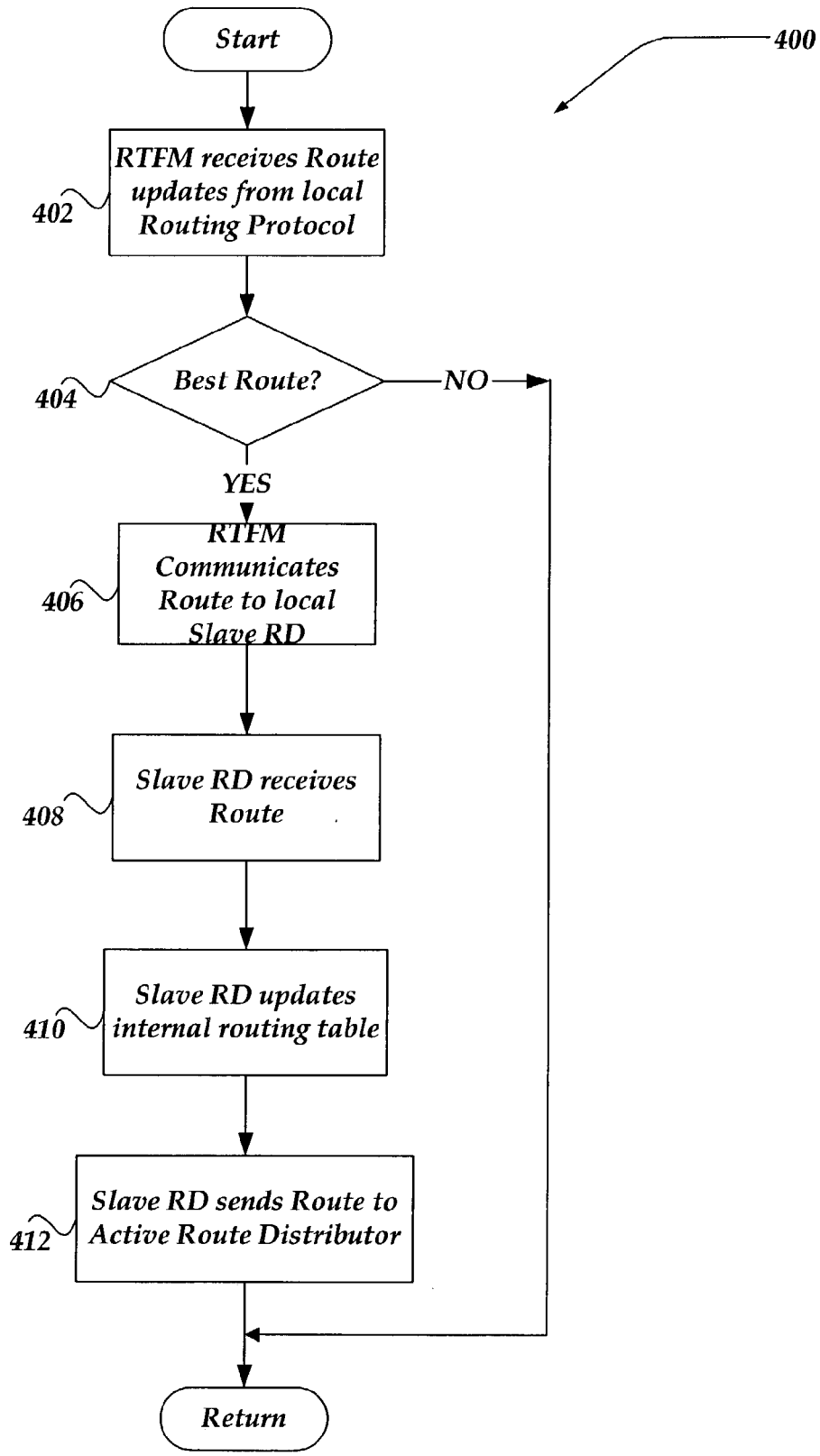
FIG. 4 is a flow diagram generally showing one embodiment for a process of distributing a local routing protocol.

The operation of certain aspects of the present invention will now be described with respect to FIGS. 4–6. FIG. 4 is a flow diagram generally showing one embodiment of a process for distributing a local routing protocol on a slave routing module.

Process 400 begins, after a start block, at block 402 where a non-active RTFM receives a route from a local routing protocol on a same node. A local routing protocol may include any of a variety of routing protocols including RIP, OSPF, ISIS, EIGRP, BGP, and the like.

Process 400 proceeds to decision block 404, where a determination is made whether the received route is a best route. A route may be determined as a best route based on a variety of considerations, including, local policies, a cost factor, shortest path, use of a preferred path, other route and route information stored in the non-active RTFM database, and the like. In any event, if, at decision block 404, it is determined that the received route is not the best route, process 400 returns to performing other actions. Alternatively, if it is determined that the received route is the best route, process 400 continues to block 406.

At block 406, the non-active RTFM redistributes the route to other local routing protocols on the local RM. In one embodiment, the non-active RTFM employs a switch tag to enable the redistribution of the route. The non-active RTFM also notifies the local routing protocol associated with the route that the route is the best route.

Process 400 continues to block 408, where a slave RD receives the route. In one embodiment, the slave RD receives the route through a Notification Change List (NCL). The process moves to block 410, where the slave RD populates its internal routing table with the route. Process 400 flows to block 412 where the slave RD sends the route to an active RD on another node. In one embodiment, the slave RD sends the route based in part on a timed update. Upon completion of block 412, process 400 returns to performing other actions.

Figure 5:
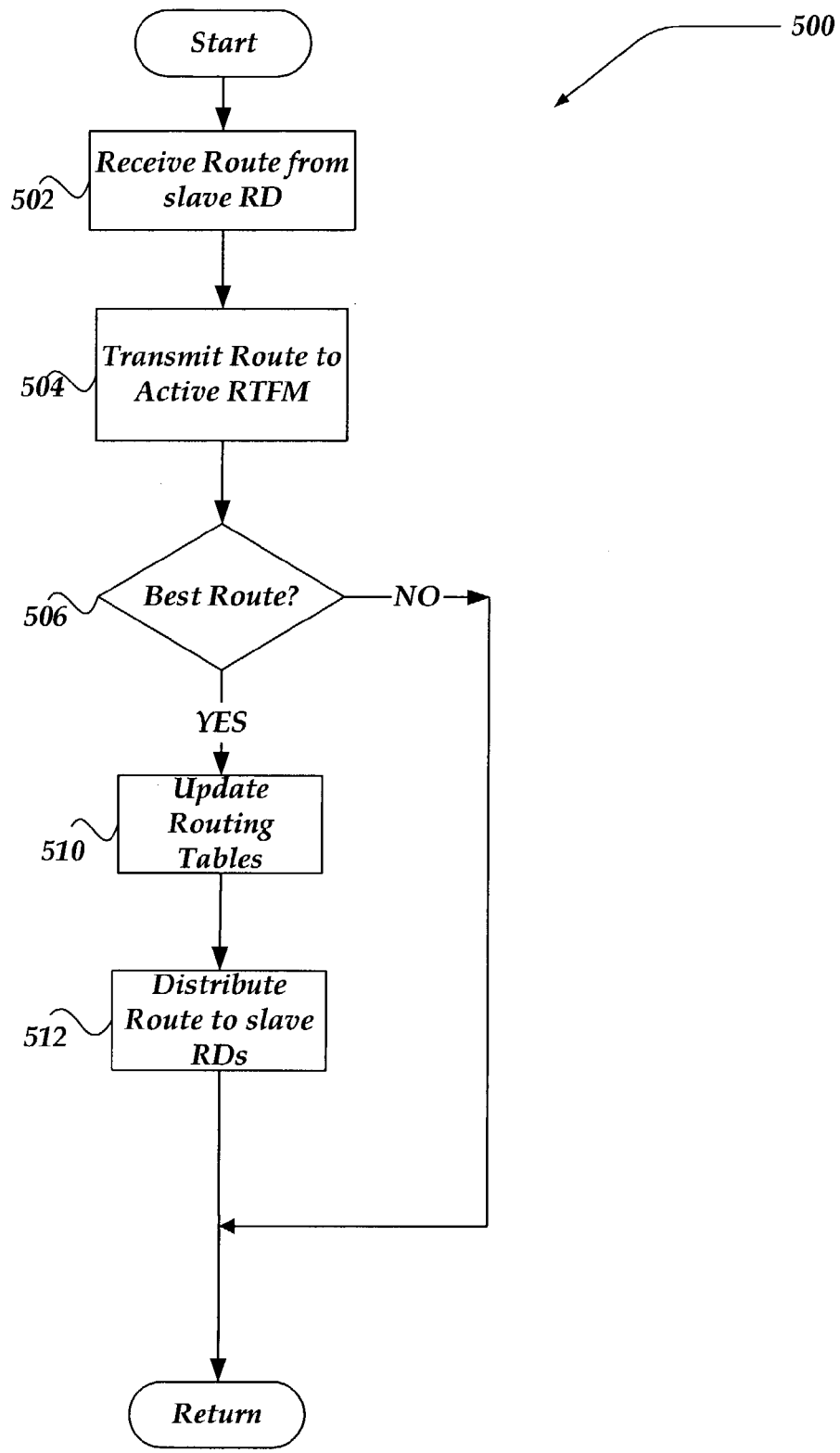
FIG. 5 is a flow diagram showing one embodiment for a process of distributing a route to a slave route distributor in a distributed routing platform.

FIG. 5 is a flow diagram showing one embodiment of a process for distributing a route to a slave RD in a distributed routing platform.

Process 500 begins, after a start block, at block 502 where an active RD receives a route from a slave RD on a remote node. The active RD updates its external routing table with the route. Moreover, the active RD associates a multi-level classification rule with the route. In one embodiment, there is a two-level classification rule that enables identification of the owner (L2) and instance (L1) of the route. The owner indicates the source RM (routing module) of the route, while the instance indicates which routing protocol added that route. For example, briefly referring to FIG. 2, a received route might have associated with it an L2=RM 142, and an L1=RP 232.

Process 500 continues to block 504 where the active RD transmits the route and associated classification rule to the active RTFM. The process proceeds to decision block 506, where a determination is made whether the received route is the best route. A route may be determined as a best route based on a variety of considerations, including, local policies, a cost factor, shortest path, use of a preferred path, other routes stored in the active RTFM database, and the like. In any event, if, at decision block 506, it is determined that the route is not the best route, process 500 returns to performing other actions. Alternatively, if it is determined that the route is the best route, process 500 continues to block 510.

The active RTFM also notifies the active RD that the route is the best route.

Process 500 continues to block 510, where based on the notification from the active RTFM, the active RD populates its internal routing table with the route and associated classification rule. The process proceeds to block 512, where the active RD distributes the route and associated classification rule to slave RDs on other nodes in the distributed routing platform. In one embodiment, the active RD distributes the route and associated classification rule through an inter process communications, such as GDP. Upon completion of block 512, process 500 returns to performing other actions.

Figure 6:
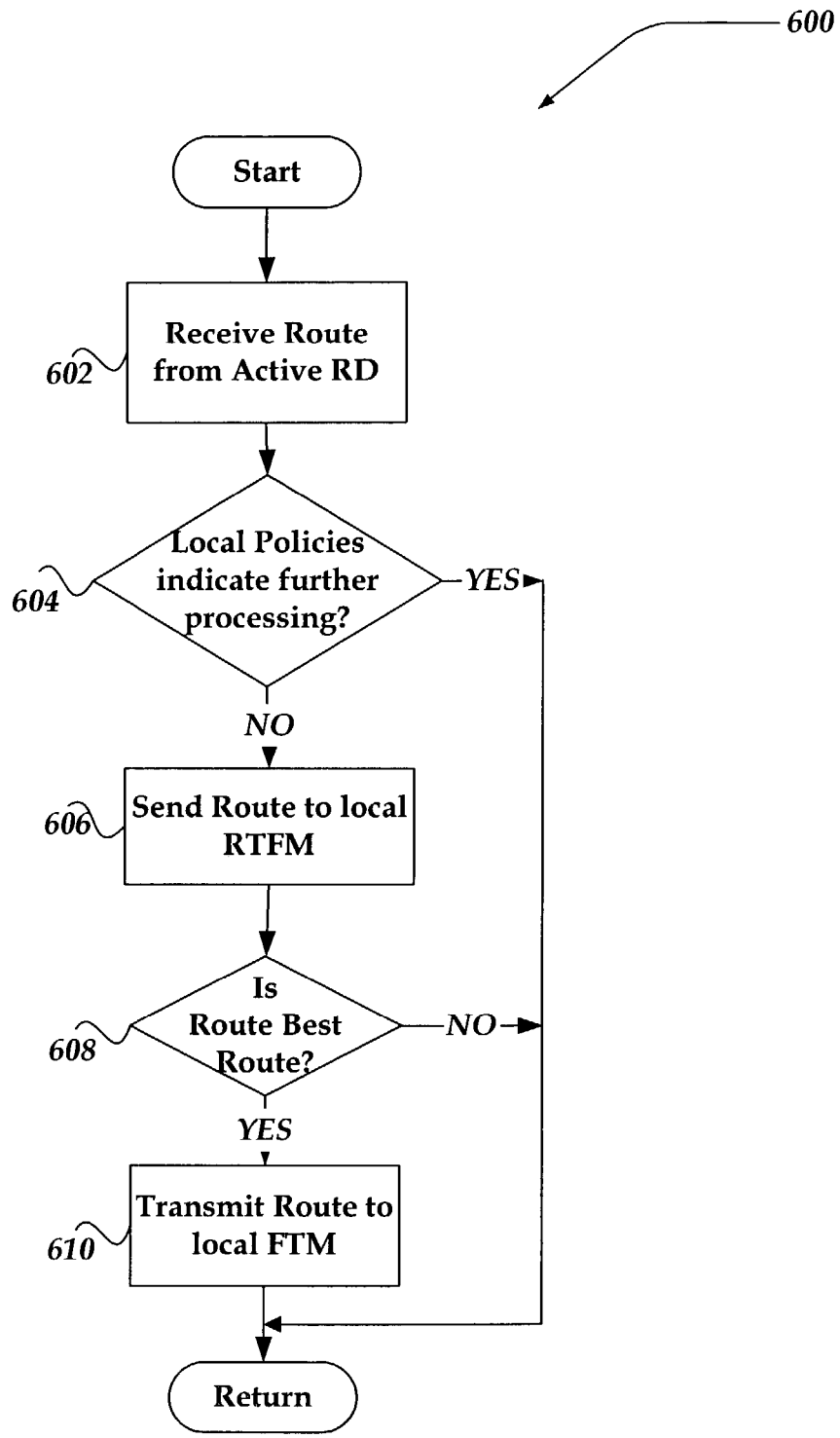
FIG. 6 is a flow diagram showing one embodiment for a process of receiving a route from an active route distributor.

FIG. 6 is a flow diagram showing one embodiment of a process for receiving a route from an active RD.

Process 600 begins, after a start block, at block 602 where a slave RD on another node receives a route and associated classification rule from the active RD. The slave RD extracts the associated classification rule and applies local policies to determine further processing of this classification rule. Upon receipt of the route and associated classification rule, process 600 continues to decision block 604, where a determination is made whether the local policies indicate further processing. If it is determined that local policies indicate further processing, the process returns to performing other actions. Alternatively, if, at decision block 604, it is determined that the local policies do not indicate further processing, process 600 continues to block 606, where the route and associated classification rule are sent to the local RTFM.

Process 600 proceeds to decision block 608, where the local RTFM performs an analysis to determine whether the route is the best route. If, at decision block 608, it is determined that the route is not the best route, the process returns to performing other actions. Alternatively, if it is determined that the route is the best route, the process continues to block 610, where the local RTFM proceeds to transmit the route to the local FTM. Upon completion of block 610, process 600 returns to performing other actions.

Active/Standby Routing Modules:

Management of fail-over operations for routing modules typically involves at least one routing module being configured to operate as a standby RM. For an RM to operate as the standby RM in a distributed routing system, it is desirable for the internal routing table in the active RD to be kept substantially in synchronization with a Standby RD. This is so that after a switchover, the Standby RD may assume the role of the active RD, virtually from where the original active RD had left off before the switchover. The switchover may be performed in such a way that it is virtually transparent, or seamless to an external system connected to the "Distributed Routing Platform"," of FIG. 1. The external systems connected to the "Distributed Routing Platform" of FIG. 1 may also not be aware of the switchover or presence of an active and standby configuration. Traditional approaches to standby configurations, however, may provide inadequate synchronization of the internal routing tables.

For example, some approaches attempt to maintain synchronization through a process sometimes referred to as "check pointing." In check pointing, a route is first updated on a standby device. Once an acknowledgement is received from the standby device, the active device distributes the route. After a switchover, the standby device identifies unsynchronized routes and distributes these routes. However, such approaches tend to be slow, as each route often must be check pointed with the standby device before being distributed.

Another approach to synchronization has the active and standby devices operating virtually independently to distribute routes. In these approaches, the slave devices must maintain state information about the routes distinct from the active and standby devices. After a switchover, ever slave device revalidates its internal routing table, performing necessary operations on the routes, to resynchronize with new active device. These approaches may require each slave device to manage local resynchronizations, which may result in slower overall synchronizations, and a greater likelihood of inconsistencies.

Hence, at one embodiment of the present invention addresses the above-mentioned shortcomings, by enabling the standby RD to distribute the route information, rather than the active RD. Moreover, as is described below, the active RD is configured to proceed with route processing, without waiting for an acknowledgement from the standby RD.

Figure 7:
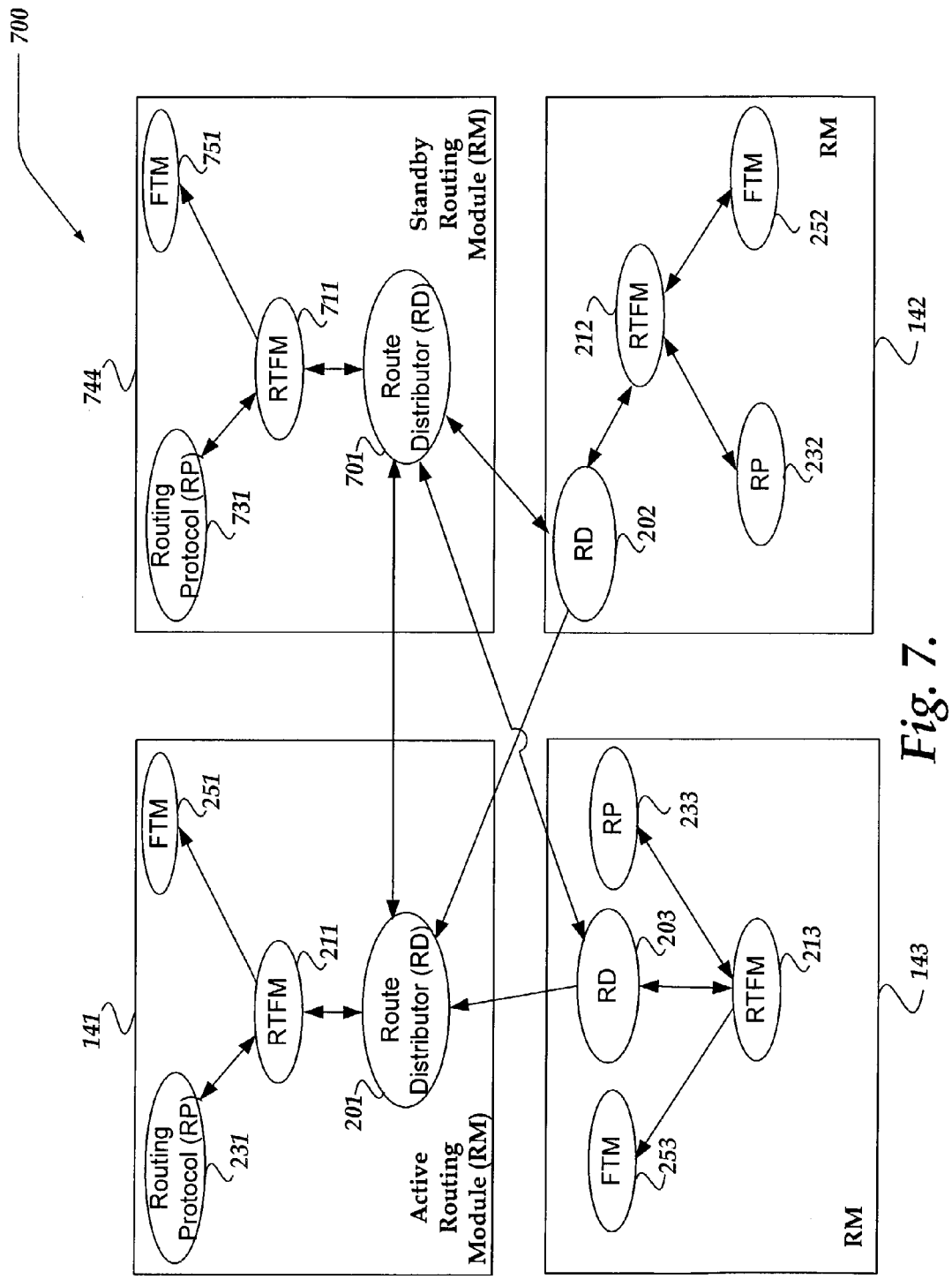
FIG. 7 illustrates a functional block diagram of one embodiment of an active route distributor and a standby route distributor.

FIG. 7 illustrates a functional block diagram of one embodiment of an active RD and a standby RD, in accordance with the present invention. Active/Standby configuration 700 may include many more components than those shown in the figure. However, the components shown are sufficient to disclose an illustrative environment for practicing the present invention.

As shown in the figure, Active/Standby configuration 700 includes RMs 141–143, and 744. RMs 141–143 include components substantially as described in conjunction with FIGS. 1–6. RM 744 includes RP 731, FTM 751, RTFM 711, and RD 701. Also shown in the figure, RD 201 is in communication with RDs 202–203 and RD 701. Moreover, RD 701 is in communication with RDs 201–203. RM 141 represents the active RM, while RM 744 represents the standby RM. RD 201 represents the active RD, and RD 701 represents the standby RD. Although not shown, RM 744 may be another RM in distributed routing platform 100 of FIG. 1. In another embodiment, RM 744 resides in a different distributed routing platform.

RP 731 operates substantially as RPs 231–233. FTM 751 operates substantially as FTMs 251–253. RD 701 operates substantially similar to RDs 201–203. RTFM 711 operates substantially similar to RTFMs 211–213. However, because RM 744 is designated as a Standby RM, RTFM 711 may, under situations such as a switchover between active RM 141 and standby RM 744, assume additional operations substantially similar to an active RTFM.

As shown in FIG. 7, RD 201 is configured to receive route information from RDs 202–203, RD 701, and RTFM 211. RD 201 employs the received route information to update its internal routing table. When RD 701 is unavailable, RD 201 may distribute route information to the slave RDs 202–203, substantially as described above, in conjunction with FIGS. 1–6. When RD 701 is available, however, RD 201 may forward its internal routing table, and other route information to RD 701, as described in more detail in conjunction with FIG. 9.

RD 701 is configured to receive RD 201's internal routing table, and other route information. RD 701 may also receive route information from RTFM 711. RD 701 may distribute the received route information to slave RDs 202–203, as described in more detail in conjunction with FIG. 10. In one embodiment, RD 701 distributes the route and route information to the slave RDs by way of an inter process communications protocol, such as GDP, DDE, SPX, IAC, and the like.

RD 701 may maintain state information on a per route basis for routes received from RD 201 and RTFM 711, as described in more detail in conjunction with FIG. 8. Should RD 201 become unavailable for any of a variety of reasons, RD 701 is configured to assume the role of the active RD. As part of the switchover of roles, RD 701 examines the maintained state information for routes that may need to be resynchronized. Based in part on the examination, RD 701 may provide the slave RDs with the resynchronized route.

FIG. 8 illustrates one embodiment of a table of states and actions employed during a resynchronization between routing modules, in accordance with the present invention. Resynchronization table 800 includes routes 802, active states 804, standby states 806, and resynchronization actions 808. Although, resynchronization table 800 is illustrated as a table, the present invention is not so constrained. For example, resynchronization table 800 may be implemented as a set of equations, linked lists, files, executable program code, switches, logic gates, or the like. Resynchronization table 800 may include many more elements than those shown in FIG. 8. However, the elements shown are sufficient to disclose an illustrative environment for practicing the present invention.

The standby RD 701 may maintain state information on a per route basis. States may be maintained in pairs, to reflect actual operations that were performed on a given route by the standby RD and the active RD. Thus, for example, in FIG. 8, route 1 in routes 802 has associated with it an add operation from the active RD, as shown in active states 804. Route 1 also has associated with it an initialize operation from the standby RD, as shown in standby states 806.

During a resynchronization, routes 802's associated operations are resynchronized based on the corresponding action indicated by resynchronization action 808. Thus, for example, route 1's operation after the resynchronization is a delete. Similarly, route 3's operation after the resynchronization is a modify, and so forth.

A route is said to be in a clean state if the active and standby operations, and the route attributes are substantially the same. Otherwise, a route is said to be in a dirty state. If a route's active state is substantially the same as its standby state, then the route is marked clean, as described below in conjunction with FIG. 10.

Two copies of the route may also be maintained when a route is in the dirty state. In one embodiment, dirty routes and related information is maintained in a linked list to enable efficient processing during a switchover between the active RD and the standby RD.

As shown in FIG. 8, a route operation may include an add, initialize, a clean, a modify, and a delete operation. Other route operations not present in resynchronization table 800 may be considered invalid. An initialize route operation indicates that a route is present in resynchronization table 800, but no actual operation has been received, yet. An add, delete, and modify route operation indicates that the associated route operation is scheduled. Moreover, a slave route distributor may consider an add route operation as a modify route operation where the route is already present in the slave route distributor's local routing table. If active states 804 and standby states 806 for a given route both indicate a delete operation, the associated route is marked as clean. Route attributes need not be considered during a delete operation. Moreover, the clean route may be removed from resynchronization table 800.

A route attribute associated with a route may be different between the active RD operation and the standby RD operation. If the route has different route attributes, both sets of route attributes may be stored as part of the route. As part of a switchover resynchronization, the route attributes maintained for the active state may be released. The states described in FIG. 8, however, are employed for the active to standby RD resynchronization process described in conjunction in conjunction with FIG. 10, below. States maintained for the actual distribution of a route from the distributing RD is outside the scope of FIG. 8.

Generalized Operation of Active/Standby Route Distributors

Figure 9:
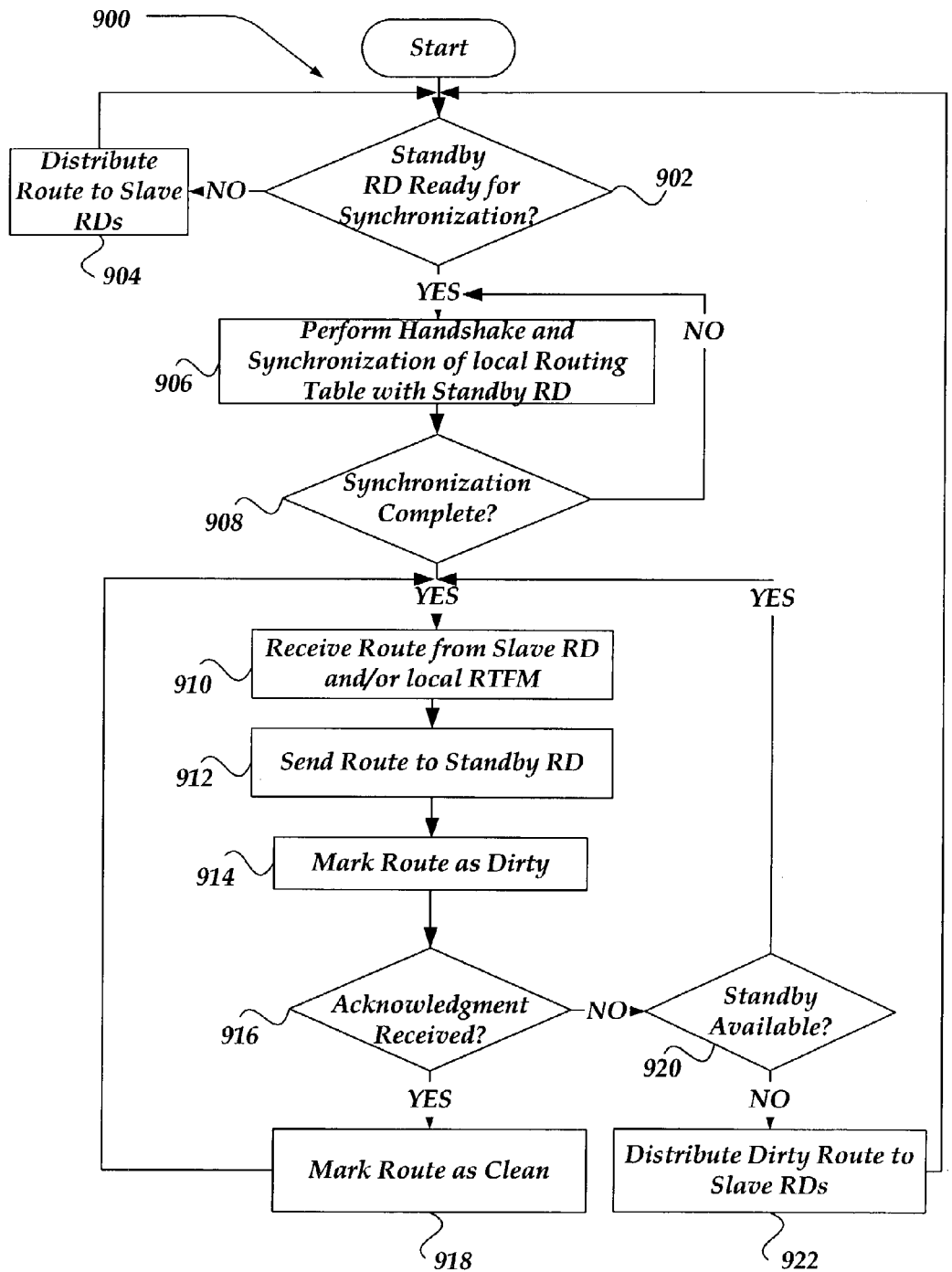
FIG. 9 is a flow diagram showing one embodiment for a process of updating route information by the active route distributor in a distributed routing platform.

The operation of certain aspects of the present invention will now be described with respect to FIGS. 9–10. FIG. 9 is a flow diagram showing one embodiment for a process of updating route information by the active RD in a distributed routing platform. Thus, as shown in FIG. 9, process 900 may be deployed in active RD 201. Process 900 begins, after a start block, at decision block 902 where an active RD has populated its internal routing table with a route received from a slave RD and/or its local RTFM.

At decision block 902 a determination is made whether a standby RD is available for synchronization with the active RD. If it is determined that a standby RD is available for synchronization processing proceeds to block 906; otherwise, processing branches to block 904.

At block 904, because the standby RD is unavailable, the active RD distributes the route to the slave RDs on other nodes in the distributed routing platform. In one embodiment, the active RD distributes the route through an inter process communications, such as GDP. Upon completion of block 904, process 900 returns to decision block 902.

At block 906, the active RD sets up a session with the standby RD. This may be accomplished through a sequence of handshaking messages between the active RD and the standby RD. The active RD then synchronizes route information with the standby RD by sending a copy of its internal routing table to the standby RD. In one embodiment, the active RD provides its internal routing table in a bulk update to the standby RD. During initial synchronization with the standby RD, routes, route operations, and the like received by the active RD are saved in a storage location, such as a buffer, until the synchronization is complete.

Processing continues to decision block 908, where a determination is made whether the synchronization is complete. If it is determined that the synchronization is incomplete, processing branches back to 906; otherwise, processing continues to block 910.

At block 910, the active RD receives an additional route (operation) from another slave RD, and from the active RTFM. The active RD also examines any additional routes that may be stored during the initial synchronization action. The active RD updates its external routing table with the additional route. Based in part on information from the active RTFM, the active RD populates its internal routing table with the additional route and related route information. Such information may include, but is not limited to, whether the route is a best route. Process 900 next proceeds to block 912. At block 912, the active RD sends the additional route to the standby RD. Processing continues to block 914 where the active RD marks the additional route as dirty. Processing continues to decision block 916.

At decision block 916, a determination is made whether an acknowledgement is received from the standby RD and the attributes of the route are substantially the same. The acknowledgement indicates that the standby RD has received and processed the additional route and related information. If no acknowledgement is received, processing branches to decision block 920; otherwise, processing branches to block 918.

While a flow from block 910 through block 920 illustrates a logical flow for a given route, process 900 may be readily extended to multiple routes without departing from the scope or spirit of the present invention.

It is also noted, that the process of sending the route, as described in block 912, and the process of receiving an acknowledgement as described in decision block 916 need not be synchronous, as illustrated in FIG. 9. That is, the acknowledgements may be received asynchronously. For example, routes 1, 2, and 3 may be sent at time T1. At time T1+t, the acknowledgement for route 1 may be received, while the acknowledgements for routes 2 and 3 may be received at time T1+2t.

At block 918, the additional route that was sent to the standby RD is marked as clean. Processing then loops back to block 910 to receive and process additional route and route information from slave RDs and/or the local RTFM, substantially as described above.

Alternatively, at decision block 920, a determination is made whether the standby RD is available. The standby RD may be unavailable for a variety of reasons, including a failure, a removal of the standby RM, or the like. In any event, if the standby RD is available, processing loops back to block 910 to perform actions substantially as described above. In this manner, the active RD is not constrained to waiting for an acknowledgement from the standby RD.

If however, the standby RD is unavailable, processing branches to block 922, where each route in the active RD's internal routing table that is marked as dirty is distributed to the slave RDs. Processing then loops back to decision block 902, to continue substantially as described above.

Figure 10:
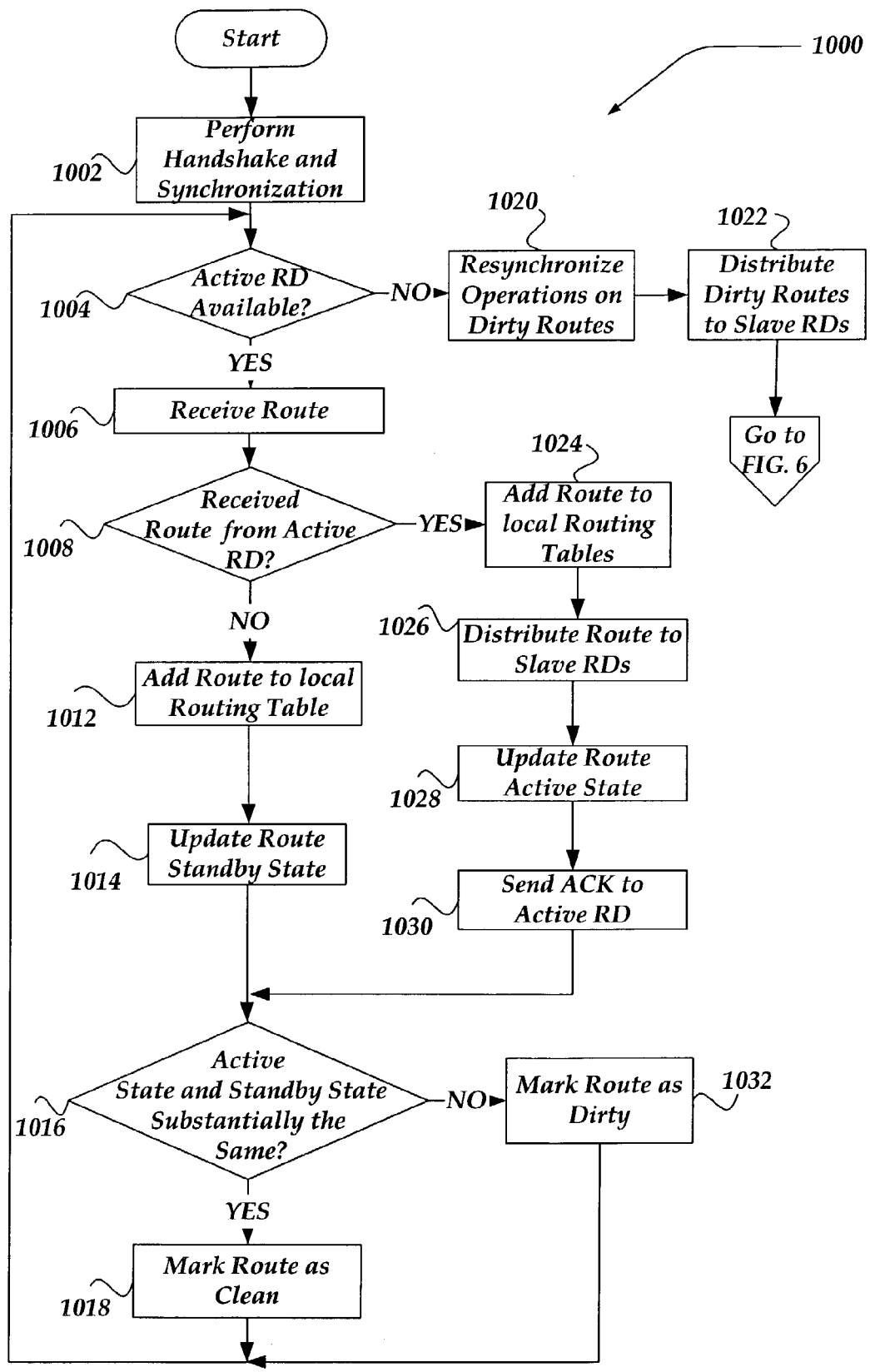
FIG. 10 is a flow diagram showing one embodiment for a process of updating route information by the standby route distributor in a distributed routing platform, in accordance with aspects of the invention.

FIG. 10 is a flow diagram showing one embodiment for a process of updating route information by the standby RD in a distributed routing platform, in accordance with aspects of the invention. As such, as shown in FIG. 7, process 1000 may be deployed in standby RD 701.

Process 1000 begins, after a start block, at block 1002, when the standby RD is placed on-line and becomes available for communications with the active RD. At block 1002, the standby RD performs an initial handshake communication with the active RD. Upon completion of the handshake, the standby RD receives routing information from the active RD. The standby RD employs the received routing information to initially synchronize its internal routing table with the active RD's routing table.

Processing continues to decision block 1004, where a determination is made whether active RD is available. The active RD may become unavailable for a variety of reasons, including a failure on the active RM, a removal of the active RM, or the like. If the active RD is available, processing continues to block 1006; otherwise, processing branches to block 1020, where the standby RD performs actions described below to assume the role of the active RD.

At block 1006, a route is received. Processing continues to decision block 1008, where a determination is made whether the received route is from the active RD. If the received route is from the active RD, processing branches to block 1024; otherwise, the route is assumed to be received from a local RTFM and processing continues to block 1012.

At block 1012 the received route is considered to be from the local RTFM on the standby RM. Thus, the standby RD adds the received route to its local routing table. Processing proceeds to block 1014, where the standby RD updates the standby state of the route with route information, as described above in conjunction with FIG. 8. Processing continues to decision block 1016.

Alternatively, if, at decision block 1008, it is determined that the route is from the active RD, processing continued to block 1024, where the standby RD adds the received route to its local routing table. Processing continues to block 1026, where the standby RD distributes the route through an inter process communications, such as GDP. Processing continues to block 1028, where the standby RD updates the active state of the route with route information, as described above in conjunction with FIG. 8. Processing proceeds to block 1030, where an acknowledgement is sent to the active RD, indicating that the route was received and processed. Processing continues to decision block 1016.

At decision block 1016, a determination is made whether the active state and the standby state associated with the route are substantially the same. If the states are substantially the same, processing branches to block 1018, where the route is marked as clean; otherwise, processing branches to block 1032, where the route is marked as dirty. If the operations associated with the route for its active and standby states are adds, or modifies, and the associated route attributes are the same, the route is marked clean. If the operations associated with the route for its active and standby states are deletes, the route is marked as clean. Additionally, information associated with the clean route may be removed from resynchronization table 800 of FIG. 8. In any event, processing loops back to decision block 1004 to perform actions substantially as described above.

Continuing from decision block 1004, if it is determined that the active RD is not available, processing branches to block 1020, as indicated above. At block 1020, the standby RD examines each route that is marked dirty and resynchronizes its associated route operation and route attributes. Resynchronization is performed employing the states and resynchronization actions as described above, in conjunction with FIG. 8. For each dirty route (e.g., the active state and standby routing state and attributes are not substantially the same), the associated route operations and attributes are replaced by the corresponding resynchronization action. Moreover, any add or modify operation that is performed as a result of the resynchronization, is typically performed employing the route attributes associated with the standby RD.

Processing continues to block 1022, where the standby RD distributes each route marked dirty, along with its related route information to each slave RD. If a switchover is performed under stable conditions, the resynchronization operation typically will not include dirty routes, and hence there may not be a redistribution of route information by the standby RD. In one embodiment, the slave RD discards any duplicate route operations that is received as part of the resynchronization. Processing then proceeds to FIG. 9, where the standby RD assumes the role of the active RD.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by one or more processors to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method for synchronizing a routing table, comprising:
   (a) receiving a route;
   (b) updating an active routing table associated with an active route distributor with the route;
   (b) forwarding the route to a standby route distributor;
   (c) updating a standby routing table associated with the standby route distributor, wherein at least a portion of the standby routing table and the active routing table are substantially synchronized; and
   (d) employing the standby distributor to distribute the route to a slave route distributor, wherein the slave route distributor is enabled to update a slave routing table associated with the slave route distributor.

2. The method of claim 1, wherein receiving the route further comprises receiving the route from a routing protocol that comprises at least one of a static routing protocol, default routing protocol, Routing Information Protocols (RIPs), Open Shortest Path First (OSPF), Enhanced Interior Gateway Routing Protocol (EIGRP), ISIS, and Border Gateway Protocol (BGP).

3. The method of claim 1, wherein the method is performed within nodes on a distributed routing platform.

4. The method of claim 1, wherein forwarding the route to the standby route distributor, further comprises associating an operation with the route.

5. The method of claim 4, wherein an operation further comprises at least one of an add, modify, initialize, and delete operation.

6. The method of claim 1, wherein distributing the route further comprises distributing the route through an inter node communication.

7. The method of claim 1, wherein employing the standby route distributor to distribute the route further comprises:
   updating a route state associated with the route; and
   providing an acknowledgement from the standby route distributor to the active route distributor.

8. The method of claim 1, further comprising:
   receiving another route by the standby route distributor from a routing protocol associated with the standby route distributor;
   updating the standby routing table; and
   updating a route state associated with the other route.

9. The method of claim 1, further comprising:
   if an acknowledgement is received by the active router distributor, marking the forwarded route as clean by the active route distributor.

10. The method of claim 1, further comprising, marking the route by the standby route distributor based on a comparison of an active state and a standby state associated with the route.

11. The method of claim 10, wherein marking the route further comprising:
   if the active state is substantially different from the standby state, identifying the route as dirty; and
   if the active state is substantially the same as the standby state, identifying the route as clean.

12. The method of claim 1, further comprising:
   if the active route distributor is unavailable, resynchronizing the route on the standby route distributor;
   distributing the resynchronized route to at least one slave route distributor; and
   assuming an action of the active route distributor by the standby route distributor.

13. A method of synchronizing a routing table, comprising:
   (a) employing a standby route distributor to receive a route;
   (b) adding the received route to a routing table associated with the standby route distributor; and
   (c) if the route is from an active route distributor, employing the standby route distributor to perform actions, including:

(i) distributing the route to at least one slave route distributor, wherein the slave route distributor is enabled to update a slave routing table associated with the slave route distributor;
(ii) updating an active state associated with the route; and
(iii) providing a response to the active route distributor, wherein the response indicates that at least a portion of the routing table associated with the standby route distributor is substantially synchronized with another routing table that is associated with the active route distributor.

14. The method of claim 13, further comprising:
(a) if the route is from a routing protocol associated with the standby route distributor, updating a standby state associated with the route; and
(b) marking the route based on a comparison of the active state and standby state associated with the route.

15. The method of claim 14, wherein marking the route further comprises:
if the active state and the standby state associated with the route are substantially the same, identifying the route as a clean route; and
if the active state and the standby state associated with the route are substantially different, identifying the route as a dirty route.

16. The method of claim 13, further comprising:
if the active route distributor is unavailable, resynchronizing the route on the standby route distributor;
distributing the resynchronized route to at least one slave route distributor; and
assuming an action associated with the active route distributor by the standby route distributor.

17. The method of claim 16, wherein resynchronizing the route further comprises determining an operation associated with the route based in part on a comparison between a standby state and the active state associated with the route.

18. A router for updating a routing table, comprising:
(a) a slave route distributor on a first node that is configured to receive a route associated with a routing protocol associated with the slave route distributor;
(b) an active route distributor on a second node that is configured to perform actions, including:
(i) receiving the route from the slave route distributor;
(ii) updating an active routing table associated with the active route distributor; and
(c) a standby route distributor on a third node that is configured to perform actions, including:
(i) receiving the route from the active route distributor;
(ii) updating a standby routing table associated with the standby route distributor, wherein at least a portion of the standby routing table and the active routing table are substantially synchronized; and
(iii) distributing the route to another slave route distributor, wherein the other slave route distributor is configured to update another routing table associated with the other slave route distributor.

19. The router of claim 18, wherein the router is a distributed routing platform.

20. The router of claim 18, wherein if the active route distributor is unavailable, the standby route distributor is configured to perform actions, further comprising:
(a) resynchronizing a route operation in the standby routing table associated with the standby route distributor;
(b) distributing the route to each slave route distributor; and
(c) assuming the actions of the unavailable active route distributor.

21. The router of claim 20, wherein resynchronizing the route operation further comprises a means for determining an action based in part on an active state and a standby state associated with the route.

22. The router of claim 20, wherein the route operation further comprises at least one of an initialize, add, modify, and delete operation.

23. A system for updating a routing table, comprising:
(a) an active route distributor that is configured to perform actions, including:
(i) receiving a route;
(ii) updating an active routing table associated with the active route distributor with the route; and
(b) a standby route distributor that is configured to perform actions, including:
(i) receiving the route from the active route distributor;
(ii) updating a standby routing table associated with the standby route distributor, wherein at least a portion of the standby routing table and the active routing table are substantially synchronized; and
(iii) distributing the route to a slave route distributor, wherein the slave route distributor is configured to update a slave routing table associated with the slave route distributor.

24. The system of claim 23, wherein the active route distributor, and standby route distributor each reside on a different node in a distributed routing platform.

25. The system of claim 23, wherein the active route distributor and standby route distributor each reside in a different distributed routing platform.

26. An apparatus for updating a routing table, comprising:
(a) a means for receiving a route from a slave route distributor, and updating an active routing table with the route, wherein the active routing table is associated with an active route distributor; and
(b) a means for employing a standby route distributor to receive the route from the active route distributor, wherein the standby route distributor distributes the route to another slave route distributor, and updates a standby routing table associated with the standby route distributor, and wherein at least a portion of the standby routing table and the active routing table are substantially synchronized.

* * * * *